Figure 3:
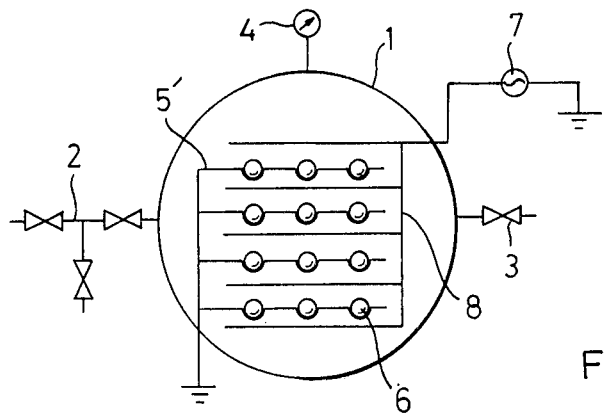

United States Patent [19]

Oyachi et al.

[11] Patent Number: 4,613,403
[45] Date of Patent: Sep. 23, 1986

[54] METHOD FOR TREATING GOLF BALL SURFACE WITH GLOW DISCHARGE PLASMA AND APPARATUS THEREFOR

[75] Inventors: Tomio Oyachi, Akikawa; Minoru Takahashi, Kawasaki; Koichi Izuhara, Yokohama; Setsuo Akiyama, Higashi Murayama; Masato Yoshikawa, Tokyo, all of Japan

[73] Assignee: Bridgestone Corp., Tokyo, Japan

[21] Appl. No.: 744,439

[22] Filed: Jun. 13, 1985

[30] Foreign Application Priority Data

Aug. 13, 1984 [JP] Japan .................................. 59-167934

[51] Int. Cl.$^4$ ..................... B44C 1/22; C03C 15/00; C03C 25/06; B29C 17/08
[52] U.S. Cl. .................................. 156/643; 156/646; 156/668; 156/345; 204/192.32; 204/298
[58] Field of Search ............... 156/643, 646, 668, 345, 156/272.6; 204/164, 192 EC, 192 E, 298; 427/38, 39, 307; 118/730, 620, 50.1

[56] References Cited

U.S. PATENT DOCUMENTS 4,410,586 10/1983 Ladizesky et al. .......... 156/272.6 X
4,504,349 3/1985 Ueno et al. ........................ 156/272.6

Primary Examiner—William A. Powell
Attorney, Agent, or Firm—Sughrue, Mion, Zinn Macpeak & Seas

[57] ABSTRACT

Method for treating golf ball surface which is made of balta resin, thermoplastic elastomer, ionomer resin or the like to unpolymerizable gas plasma and then applying usual coating in an apparatus adapted to expose the all over surface of the ball to said plasma. Owing to this treatment, exfoliation of the ball coating can unexpectedly sufficiently be prevented.

13 Claims, 7 Drawing Figures

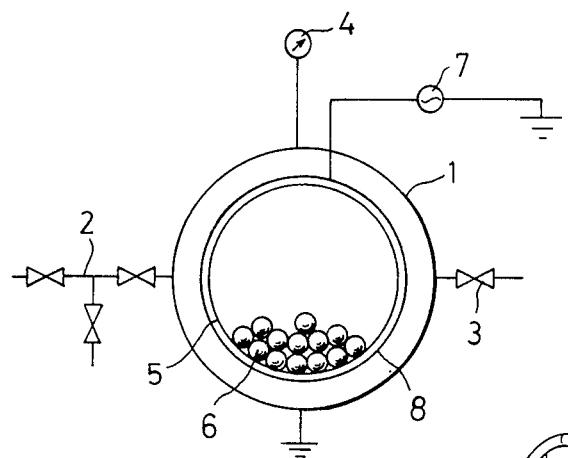
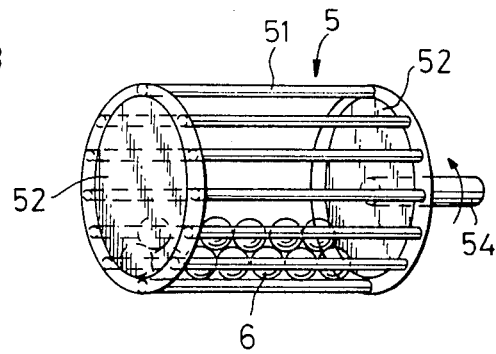
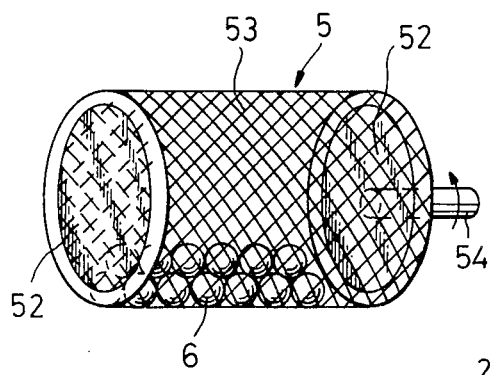
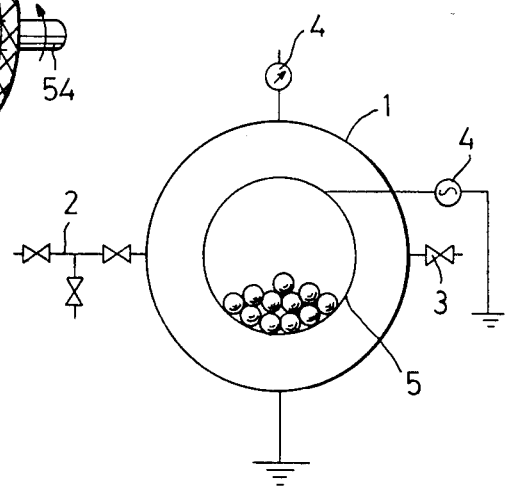

METHOD FOR TREATING GOLF BALL SURFACE WITH GLOW DISCHARGE PLASMA AND APPARATUS THEREFOR

BACKGROUND OF THE INVENTION

The invention relates to a method for treating the golf ball surface with unpolymerizable gas plasma so that the coating may be hard-exfoliative and an apparatus therefor.

There are provided various structure golf balls, which may be divided into two types. One type is the so-called thread-wound ball which comprises a core having a center which is a spherical bag filled with rubber latex etc. and rubber thread wound therearound, and an outer layer covering said core. The other type is the solid ball which comprises an inner layer or a plurality of layers of respectively different materials and an outer layer covering said inner layer(s).

Said outer layer of either type of balls is formed with various materials which may be gutta-percha, balata, a termoplastic elastomer and a so-called ionomer which is a metallic salt of copolymer of ethylene and an unsaturated carboxylic acid. The surface of such outer layer is formed with dimples of various numbers, sizes and patterns depending on ball makers in order to improve flight distance and stability, easiness for spin and the like, and in general carved with maker's trade mark and numerical figure for identification. The outer layer of the golf ball is further applied with coating such as paint and clear lacquer for the purposes not only of good appearance but also of improving flight distance and protecting said carved marks and figures.

Such coating is, however, often party exfoliated from the ball outer layer due to strong impact with a golf club, which naturally mars the ball appearance and adversely affects on the distance and stability of the ball flight.

In order to improve adhesive bonding between said outer surface and coating, some proposals have been made. One is the so-called flame method, according to which the ball surface is treated with a flame and then applied with coating. This is, however, unsatisfactory in that not only the effect is insufficient but also the ball material is often burned which may cause fire. Another countermeasure is to roughen the ball surface for instance by sand blasting and then apply the coating, which is also unsatisfactory in that precisely designed and formed dimples are damaged more or less to adversely affect on the ball flight and the purpose of improving the adhesive bonding of said two layers can not always satisfactorily be attained.

The technical problem of this field is, thus, to provide a method for considerably improving the adhesive bonding between the outer layer and coating of the golf ball so that coating is made hard-exfoliative without causing any other inconvenience as well as apparatus for effectively carrying out the method.

SUMMARY OF THE INVENTION

Said technical problem can be dissolved according to the invention by treating the golf ball finishedly formed but not yet applied with coating with unpolymerizable gas plasma and then applying coating in an apparatus adapted to expose the all over surface of the ball to said plasma.

Said plasma is the so-called glow discharge plasma and can be generated by applying high voltage to said gas at a low temperature of about 100° C. at the highest and under a low pressure in the range of 10–0.01 Torr, more preferably of 1–0.1 Torr.

In has been in public knowledge to treat the organic material by such glow charge plasma of unpolymerizable inorganic gas such as oxygen and nitrogen to advantageously modify the surface of said material. For instance Toshihiro HIROTSU disclosed some applications of such plasma in "Journal of Japan Metallograhic Society" PP 400–403, No. 5 Vo. 23 (1984), which are plasma treatment of polyethylene film for improving wettability and adhesion strength, such treatment of polyvinyl chloride and polyacrylonitrile for preventing phthalic acid ester used as plasticizer from eluting; and the treatment of polyester artificial blood vessel for improving adhesion strength to be well coated with collagen.

However, there is no prior art suggesting treatment of the golf ball with glow discharge plasma so as to prevent coating to be applied on the ball surface from exfoliating therefrom so far as the inventors know.

Any of an inert gas such as argon, helium and neon, a halogen gas such as chlorine, hydrogen chloride, bromine and bromine cyanide, a halide such as tin bromide, sulfur, sulfurous acid gas, a sulfide such as hydrogen sulfide, oxygen, nitrogen, hydrogen, ammonia, carbon oxide or carbon dioxide or any mixture of the above may be used in the invention so far as it can not be polymerized in plasma state.

Among the gases referred to above oxygen and a mixture gas of oxygen, preferably in the amount of more than 20% molar ratio with any of the other gases referred to above as well as argon and a mixture gas of argon, preferably in the amount of more than 20% molar ratio with any of the other gases are particularly preferable in view of that strong adhesiveness may be attained in a shorter treatment time, although the reason can not always definitely be explained. In case of oxygen or oxygen containing mixture gas, however, it is guessed to be a reason that there is involved much short wavelength component in the ultraviolet spectrum of the plasma thereof and the outer layer material of the golf ball such as ionomer has absorption maximum in short wavelength ultraviolet band.

However, the treatment with plasma gas containing oxygen must carefully be done. If the treatment is excessively carried out, undesirably strong ashing is caused different from argon. In this meaning argon or a gas mixture containing argon is most preferable for the invention.

In order to energize the gas for generating glow discharge and expose golf balls to gas plasma, it is necessary to provide a pair of electrodes, an electric source for applying voltage across said electrodes, a sealed casing, means for reducing pressure in said casing, means for inletting and outletting gas into and from said casing and means for holding golf balls in said casing or transferring golf balls into and out of said casing.

As said electric source, any of direct current, low frequency, high frequency and micro wave electric sources may be used, but in order to efficiently generate and stably hold glow discharge high frequency electric source of above 1 kHz is preferable.

A plurality of golf balls may be held as they are in the vacuum casing for plasma treatment, but it is preferable to make some consideration on said means for holding balls in the casing or transferring balls into and out of the casing so that the all over surface of the ball may be homegeneously be exposed to plasma to be explained later in detail.

Gas plasma may be generated in said vacuum casing or outside of said casing to be brought thereinto. Said casing is adapted to be decompressed preferably in the range of 10–0.01 Torr, more preferably 1–0.1 Torr for the treatment according to the invention.

The outer layer of the golf ball to be treated with glow discharge plasma according to the invention may be any of balata, thermoplastic elastomer and ionomer recently used. Since gas plasma is of a temperature below 100° C., the materials forming the golf ball, above all the outer layer thereof can not be deteriorated and the precisely designed and formed dimples can not be damaged by the treatment according to the invention. And advantageous effect attained by the treatment of the invention, namely strong adhesiveness of the coating with the outer layer of the ball may be stably held for a long time.

BRIEF EXPLANATION ON THE DRAWINGS

Figure 4:
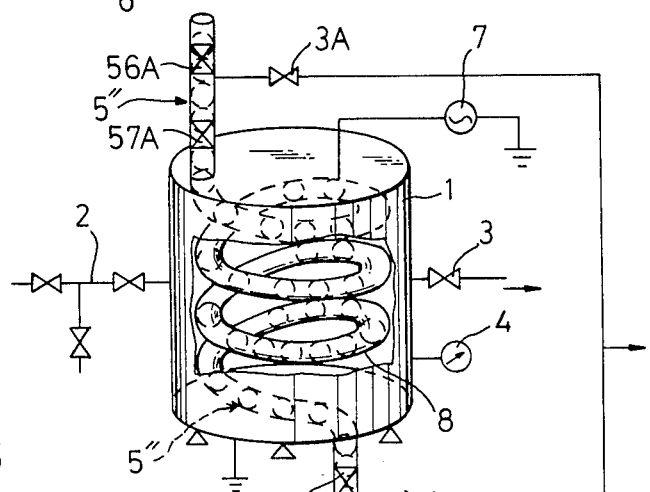
Figure 5:
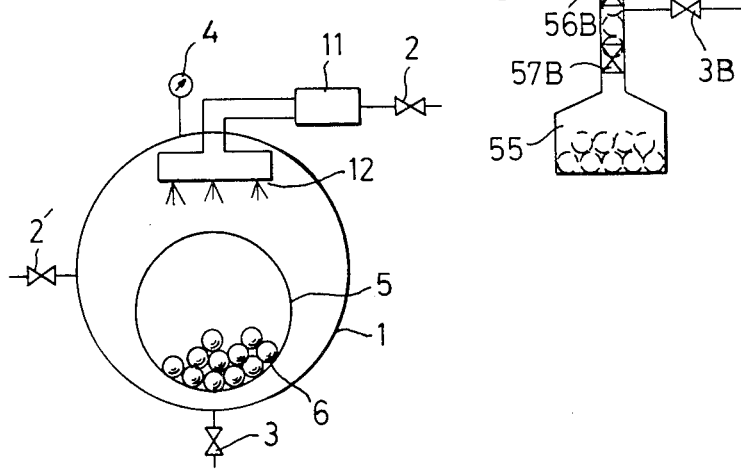

In the accompanying drawings which is only for illustrating preferred embodiments of the invention and not for limitting the invention thereto;

FIG. 1 is a schematic view of the apparatus according to the invention,

FIGS. 1A and 1B are perspective view of a rotable cage for holding golf balls therein, FIG. 2 is a similar schematic view of a modified embodiment, FIG. 3 is a schematic view of the other embodiment of the apparatus of the invention in which the balls are stationarily held by multiple shelves, FIG. 4 is a schematic view of the still other embodiment in which a spiral conduit is arranged so as to transfer golf balls into and out of the vacuum casing, FIG. 5 is a schematic view of the still further other embodiment in which glow discharge plasma is generated outside of the vacuum casing to be fed thereinto.

DETAILED EXPLANATION OF THE INVENTION

In FIG. 1 there are provided a seald casing 1, valve means 2 for inletting and outletting gas into and out of said casing so as to keep a desired volume of gas, valve means 3 arranged in a line to be led to a pump not shown for decreasing pressure in said casing, a vacuum gauge 4, a rotatably mounted cage 5 for holding golf balls 6 therein, an electric source 7 connected with one electrode 8 and earthed. In this embodiment, said casing 1 itself or the inner coating thereof is used as the other electrode which is earthed.

FIGS. 1A and 1B illustrate embodiments of said rotatable cage 5, which may be formed with a plurality of parallelly arranged bars 51 extended between opposite end walls 52 or cylindrically formed nets 53 arranged between the opposite end walls 52. Either end wall is provided with a shaft 52 to be driven for rotation by a prime mover not shown.

FIG. 2 shows a modification of the apparatus shown in FIG. 1. It is different only in that the cage 7 itself is utilized as said one electrode.

In FIG. 3, there are provided multistep shelves 5' on which a plurality of golf balls 6 are stationarily held. One electrode 6 connected with the electric source 7 is branched to be arranged opposite to each of said shelves 5' so that every ball 6 may be homegeneously exposed to plasma. Other arrangements are similar to thosed in FIG. 1 so that further explanation shall be omitted.

Different from the preceding embodiments where plasma treatment is made in a batch way, the embodiment in FIG. 4 shows an embodiment for continuously carrying out the plasma treatment, in which means 5" for transferring balls 6 through the sealed casing 1 is made in the form of a spiral conduit extended from a ball supplying box not shown which is arranged above said casing to a treated ball collecting box 55 arranged below said casing so that the ball may rollingly fall down in said conduit owing to the gravity.

In this embodiment the conduit 5" is used as one electrode and the casing 1 is used as the other electrode. In order that every ball may be well exposed to plasma, said conduit is preferably perforated.

In order to keep vacuum in the casing 1 despite that the treated balls are discharged therefrom one by one and the untreated balls are introduced thereinto one by one, there are provided a pair of normally closed gate valves 56A, 57A and 56B, 57B respectively in the inlet and outlet portions of the conduit 5". The lowermost ball having desiredly been exposed to plasma is allowed to pass into a space between said gate valves 56B, 57B by opening the former. The space has been decompressed by actuating a pressure reducing valve 3B in advance. Said ball is then allowed to fall down out of the conduit into the box 55 by opening the gate valve 57B and closing the gate valve 56A without jeopardizing vacuum in the main portion of the conduit to be kept constantly at a predetermined level.

By similarly actuating the gate valves 56A, 57A and a pressure reducing valve 3A, the balls to be treated are successively brought into the conduit 5".

In FIG. 5 plasma is generated not in the sealed casing 1 but in a sealed chamber 11 provided outside of said casing 1. Plasma gas is brought into the casing 1 from said chamber 11 through a plurality of blowoff nozzles 12 to be directed to balls contained in the rotatably mounted cage 7 in the casing.

The methods for treating the golf balls with glow discharge plasma according to the invention will be explained in more detail with reference to various examples thereof to be given hereafter.

EXAMPLE 1

200 pieces of golf balls each having the outer layer made of a thermoplastic ionomer (SARLIN manufactured by DuPont), formed with dimples and finished by removing the flash but not yet coated were treated in the apparatus as illustrated in FIG. 1.

Said balls were taken in the rotatable cage 7. The lid of the casing 1 was closed and air therein was discharged by actuating the pressure reducing valve 3 so as to make the pressure to be of $10^{-3}$ Torr. Then oxygen is supplied into said casing by actuating the valve 2 so that the pressure therein to be of 1 Torr.

With driving the rotatable cage 5 to rotate by 4 r.p.m., high frequency voltage of 13.56 MHz in the output of 400 W was applied across the electrodes 8 and 1 (casing) to treat the golf balls with oxygen gas plasma for 3 minutes. Then every ball was coated with polyurethane paint and clear lacquer.

Said treated balls were subjected to a tape peeling test and a repeatedly hitting test, of which results are shown in Column A in following Table 1 in which Columns B and C are similar test results in respect of untreated balls and balls treated with plasma but stationarily held in the casing 1 without rotating the cage 5 as controls.

Said tape peeling test is carried out by cutting the coated golf ball at the surface thereof to form 10 cross cuts with a knife where an adhesive tape is applied and abruptly peeled to observe whether or not the coating is exfoliated thereby. Said repeatedly hitting test is carried out by repeatedly hitting the ball at the head speed of 70 m/sec to observe how far the coating is exfoliated.

TABLE 1

| Test | Treatment | | |
|---|---|---|---|
| | A Treated By Invention | B Untreated | C Treated But Holding Balls Stationarilly |
| Tape Peeling | No Exfoliation At 10 Portions | Exfoliated At 9 In 10 Portions | No Exfoliation At 10 Portions |
| Repeated Hitting | No Exfoliation With Upto 100 Hittings | Exfoliated Overall Surface With 20 Hittings | Exfoliated Partly With 40 Hittings |

As seen from said Table, adhesiveness of the outer layer of the golf ball with the coating applied thereover is considerably improved as a result of glow discharge plasma in comparison with the untreated ball. The good appearance is unchagedly held regardless the severe tests. According to the repeated hitting tests, plasma treatment cannot uniformly improve the surface of the ball held stationarily in the plasma treatment casing so that the coating is correspondingly partly exfoliated.

EXAMPLE 2

Treatments and tests were carried out similar to Example 1 other than using argon instead of oxygen as gas to be energized to show just same results with those shown in Table 1.

EXAMPLE 3

The sealed casing 1 in the apparatus as shown in FIG. 4 was decompressed by actuating the valve 3 to be of $10^{-3}$ Torr and then supplied with argon so that the pressure was made to be of 1 Torr. High frequency voltage of 13.56 MHz in the output of 400 W was applied across the electrodes (conduit 5" and casing 1) to generate plasma.

Golf balls each having the outer layer of the same copolymer were taken one by one into the spiral conduit 5" by actuating the gate valves 56A, 57A and the pressure reducing valve 3A and discharged by actuating the gate valves 56B, 57B and the pressure reducing valve 3B so that every ball was subjected to plasma for 1 minute with rollingly falling down through the spiral conduit.

Similar treatments were carried out with using oxygen instead of argon.

The test results were just same with those shown in Table 1.

EXAMPLE 4

Similar golf balls were taken in the rotatable cage 7 of the apparatus as illustrated in FIG. 5. The lid of the casing 1 was closed and air in said casing and the plasma generating chamber 11 connected therewith was evacuated by actuating the pressure reducing valve 3 so as to make the pressure in said casing 1 and chamber 11 to be of $10^{-3}$ Torr. Then oxygen was supplied to said chamber 11 by actuating the valve 2 so as to pressure therein to be of 1 Torr. Microwave voltage of 2.45 GHz in the output of 1 kW was applied across the electrodes not shown to generate plasma. With rotating the cage 7 containing the balls by 4 r.p.m., plasma gas was fed through nozzles 12 into the casing 1.

The treated balls and control balls were subjected to the similar tests of which results are shown in the following Table 2.

TABLE 2

| Test | Treatment | | |
|---|---|---|---|
| | A Treated By Invention (Ex. 1) | B Treated By Invention (Ex. 4) | C Untreated |
| Tape Peeling | No Exfoliation At 10 Portions | No Exfoliation At 10 Portions | Foliated At 9 of 10 Portions |
| Repeated Hitting | No Exfoliation With Upto 100 Hittings | Slightly Foliated At 10 Portions With 100 Hittings | Foliated All Over Surface With 20 Hittings |

According to the treatment with plasma generated by applying microwave voltage by this Example, adhesiveness of the outer layer with the coating was considerably improved in comparison with the untreated ball (compare inferior to that attained by Example 1 where plasma was generated by using high frequency voltage (compare B with A). However, this Example is advantageous in that the temperature of the treated balls is not reaised at all in comparison with the treatment by plasma generated by applying high frequency voltage where the ball temperature is generally raised upto 70° C.

EXAMPLE 5

Similar balls were placed on the shelves 5' in the apparatus as illustrated in FIG. 3 and similar high frequency voltage was applied across the branched electrode 8 and the other electrode (shelves 5') in the vacuum casing 1 so as to energize oxygen gas to be in plasma. Since the both electrodes are oppositely arranged and the balls are placed on each of the shelves (as electrode), the balls are fairly homogeneously exposed to plasma gas despite of the balls stationarily held.

The test results were almost same with thosed attained by the preceding Examples.

EXAMPLE 6

Treatments similar to those in Example 1 were carried out except using the apparatus of FIG. 2 instead of the apparatus of FIG. 1.

The test results are shown in the following Table 3 which are almost same with those given in Table 1 or better a little.

TABLE 3

| Test | Treatment | |
|---|---|---|
| | Treated By Invention | Untreated |
| Tape Peeling | No Exfoliation At All 10 Portions | Exfoliated At 9 of 10 Portions |
| Repeated Hitting | No Exfoliation With Upto 100 Hittings | Exfoliated All Over Surface With 20 Hittings |

What is claimed is:
1. Method for treating golf ball surface characterized by subjecting uncoated ball to unpolymerizable gas plasma.

2. Method as claimed in claim 1, in which the outer layer of the golf ball surface is made of any of balata resin, a thermoplastic elastomer, an ionomer resin and blended material containing the above as main component.

3. Method as claimed in claim 1, in which said unpolymerizable gas is any of oxygen, argon and a mixture gas containing the above at least in the amount of more than 20% molar ratio.

4. Apparatus for treating golf ball surface characterized by comprising a sealed casing, means for holding golf balls in said casing, means for reducing pressure in said casing, means for inletting and outletting gas into and out of said casing, a pair of electrodes and an electric source for applying high voltage across said electrodes in order to generate glow discharge.

5. Apparatus as claimed in claim 4, in which said electric source is for high frequency voltage of at least 1 kHz.

6. Apparatus as claimed in claim 4, in which said casing is decompressed to be of 10–0.01 Torr, preferably 1–0.1 Torr.

7. Apparatus as claimed in claim 4, in which said means ror holding golf balls is in the form of a rotatable cage.

8. Apparatus as claimed in claim 4, in which said means for holding golf balls is in the form of multistory shelves, to each of which each of electrode branches is opposed.

9. Apparatus as claimed in claim 8, in which, each of said shelves is used as the other electrode.

10. Apparatus as claimed in claim 4, in which said means for holding golf balls is in the form of an extended conduit which is so arranged that balls may fall down therethrough by gravity with rolling one by one.

11. Apparatus as claimed in claim 10, in which said conduit is formed in meandering way.

12. Apparatus as claimed in claim 11, in which ball inlet and outlet portions of said conduit have respectively a pair of normally closed gate valves which are adapted to be alternatively opened so as to inlet a ball into a space formed therebetween and outlet therefrom, and introduce and exhaust the ball into and out of said vacuum casing, said space being adapted to be decompressed in advance to opening the outer gate valves so as to keep vacuum in the casing.

13. Apparatus as claimed in claim 4, in which said electric source and electrodes are provided outside of the casing and plasma generated therein is adapted to be fed to said casing.

* * * * *